US008439257B2

(12) United States Patent  (10) Patent No.: US 8,439,257 B2
Beals et al.  (45) Date of Patent: May 14, 2013

(54) USER CONTROL OF THE DISPLAY OF MATRIX CODES

(75) Inventors: William Michael Beals, Englewood, CO (US); Charlie William Zetterower, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 212 days.

(21) Appl. No.: 12/958,073

(22) Filed: Dec. 1, 2010

(65) Prior Publication Data

US 2012/0139826 A1    Jun. 7, 2012

(51) Int. Cl.
*G06K 7/00*    (2006.01)

(52) U.S. Cl.
USPC ........................................................ 235/435

(58) Field of Classification Search ...... 235/435–462.49
See application file for complete search history.

(56) References Cited

U.S. PATENT DOCUMENTS

| | | | |
|---|---|---|---|
| 5,510,603 A | 4/1996 | Hess et al. | |
| 5,581,636 A | 12/1996 | Skinger | |
| 5,602,377 A * | 2/1997 | Beller et al. | 235/462.15 |
| 5,703,349 A | 12/1997 | Meyerson et al. | |
| 5,978,855 A | 11/1999 | Metz et al. | |
| 6,006,990 A | 12/1999 | Ye et al. | |
| 6,058,238 A | 5/2000 | Ng | |
| 6,556,273 B1 | 4/2003 | Wheeler et al. | |
| 7,206,029 B2 * | 4/2007 | Cohen-Solal | 348/565 |
| 7,206,409 B2 | 4/2007 | Antonellis et al. | |
| 7,328,848 B2 | 2/2008 | Xia et al. | |
| 7,394,519 B1 | 7/2008 | Mossman et al. | |
| 7,424,976 B2 | 9/2008 | Muramatsu | |
| 7,604,172 B2 | 10/2009 | Onogi | |
| 7,612,748 B2 * | 11/2009 | Tateuchi | 345/81 |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

"Android App Reviews & Showcase Just a Tapp Away," Android Tapp, 10 pp. Found online at http://www.androidtapp.com/download-the-weather-channel-android-app-from-your-tv/, Oct. 22, 2010.

(Continued)

*Primary Examiner* — Thien M Le
*Assistant Examiner* — Christle Marshall
(74) *Attorney, Agent, or Firm* — Kilpatrick Townsend & Stockton LLP (57) ABSTRACT

An electronic device determines to transmit an image including a matrix code to a display, receives input specifying to alter the matrix code, generates an updated image according to the input, and transmits the updated image to the display. The device may alter a size and/or position of the matrix code, a display duration and/or complexity of the matrix code, and so on. The device may generate the matrix code and modify it in response to input, receive different matrix code versions and select a different version in response to input, receive the image including the matrix code and generate a replacement to overlay over the image, and so on Additionally, independent of input, the device may receive an image, detect an included first matrix code, generate a second matrix code based on the first, and generate an updated image by adding the second matrix code to the image.

22 Claims, 11 Drawing Sheets

U.S. PATENT DOCUMENTS

| | | |
|---|---|---|
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,186,572 B2 * | 5/2012 | Herzig .......................... 235/375 |
| 2001/0037297 A1 | 11/2001 | McNair |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0044532 A1 | 3/2004 | Karstens |
| 2005/0015800 A1 | 1/2005 | Holcomb |
| 2005/0125301 A1 | 6/2005 | Muni |
| 2005/0262548 A1 | 11/2005 | Shimojo et al. |
| 2005/0264694 A1 | 12/2005 | Ilan et al. |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 * | 3/2008 | Epshteyn et al. ............. 235/454 |
| 2008/0077324 A1 | 3/2008 | Hatano et al. |
| 2008/0092154 A1 | 4/2008 | Hogyoku |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0267537 A1 | 10/2008 | Thuries |
| 2008/0281624 A1 | 11/2008 | Shibata |
| 2009/0029725 A1 * | 1/2009 | Gerard Kindberg .......... 455/466 |
| 2009/0031373 A1 | 1/2009 | Hogyoku |
| 2009/0083808 A1 | 3/2009 | Morrison |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2011/0039573 A1 | 2/2011 | Hardie |
| 2011/0065451 A1 | 3/2011 | Danado et al. |
| 2011/0208710 A1 | 8/2011 | Lesavich |
| 2011/0264527 A1 | 10/2011 | Fitzpatrick et al. |
| 2011/0282727 A1 | 11/2011 | Phan et al. |
| 2012/0128267 A1 | 5/2012 | Dugan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0155838 A1 | 6/2012 | Gerhards et al. |
| 2012/0159563 A1 | 6/2012 | Gomez et al. |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 325 765 A | 12/1998 |
| GB | 2 471 567 A | 1/2011 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/18589 A1 | 3/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2011/009055 A2 | 1/2011 |
| WO | 2001/058146 A2 | 8/2011 |

OTHER PUBLICATIONS

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"Fox TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"Fox's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y., "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

International Search Report and Written Opinion of PCT/US11/59977 mailed on Mar. 19, 2012, 7 pages.

International Search Report and Written Opinion of PCT/US11/60002 mailed on Feb. 15, 2012, 7 pages.

International Search Report and Written Opinion of PCT/US11/60104 mailed on Mar. 29, 2012, 9 pages.

International Search Report and Written Opinion of PCT/US11/60121 mailed on Feb. 14, 2012, 7 pages.

International Search Report and Written Opinion of PCT/US11/61074 mailed on Jan. 6, 2012, 11 pages.

International Search Report and Written Opinion of PCT/US11/61211 mailed on Mar. 29, 2012, 8 pages.

International Search Report and Written Opinion of PCT/US11/61773 mailed on Feb. 21, 2012, 7 pages.

International Search Report and Written Opinion of PCT/US11/61778 mailed on Mar. 2, 2012, 7 pages.

International Search Report and Written Opinion of PCT/US11/63111 mailed on Apr. 4, 2012, 9 pages.

International Search Report and Written Opinion of PCT/US11/64709 mailed on Apr. 10, 2012, 8 pages.

International Search Report and Written Opinion of PCT/US2011/060098 mailed on Mar. 29, 2012, 10 pages.

International Search Report and Written Opinion of PCT/US2011/063308 mailed on Mar. 29, 2012, 10 pages.

International Search Report and Written Opinion of PCT/US2011/068176 mailed on Mar. 29, 2012, 15 pages.

Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.

U.S. Appl. No. 12/961,369, filed Dec. 6, 2010, Office Action mailed Mar. 9, 2012, 17 pages.

U.S. Appl. No. 12/971,349, filed Dec. 17, 2010, Office Action mailed Nov. 10, 2011, 9 pages.

U.S. Appl. No. 12/971,349, filed Dec. 17, 2010, Final Office Action mailed Jan. 20, 2012, 10 pages.

U.S. Appl. No. 12/986,721, filed Jan. 7, 2011, Office Action mailed Mar. 16, 2012, 6 pages.

Byford, D., "Universal Interactive Device," International Business Machines Corporation, Jun. 1998, 1 page.

International Search Report and Written Opinion of PCT/US11/60094 mailed on Mar. 30, 2012, 7 pages.

International Search Report of PCT/US11/60109 mailed on Feb. 14, 2012, 3 pages.

International Search Report and Written Opinion of PCT/US2011/068161 mailed on Jun. 14, 2012, 19 pages.

International Search Report and Written Opinion of PCT/US2012/021657 mailed on May 23, 2012, 12 pages.

International Search Report and Written Opinion of PCT/US2012/022405 mailed on Apr. 19, 2012, 11 pages.

International Search Report and Written Opinion of PCT/US2012/024923 mailed on May 22, 2012, 12 pages.

International Search Report and Written Opinion of PCT/US2012/024956 mailed on Jun. 11, 2012, 10 pages.

International Search Report and Written Opinion of PCT/US2012/025502 mailed Jun. 8, 2012, 13 pages.

International Search Report and Written Opinion of PCT/US2012/025607 mailed Jun. 8, 2012, 13 pages.

International Search Report and Written Opinion of PCT/US2012/025634 mailed on May 7, 2012, 8 pages.

International Search Report and Written Opinion of PCT/US2012/026373 mailed Jun. 13, 2012, 14 pages.

International Search Report and Written Opinion of PCT/US2012/026722 mailed Jun. 28, 2012, 11 pages.

Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.

Yang, C., et al., "Embedded Digital Information Integrated by Video-on-Demand System," Proceedings of the Fourth International Conference on Networked Computing and Advanced Information Management, IEEE Computer Society, 2008, 6 pages.

U.S. Appl. No. 12/971,349, filed Dec. 17, 2010, Office Action mailed Jul. 16, 2012, 11 pages.

U.S. Appl. No. 12/984,385, filed Jan. 4, 2011, Office Action mailed Jul. 12, 2012, 16 pages.

U.S. Appl. No. 12/986,721, filed Jan. 7, 2011, Notice of Allowance mailed Jun. 21, 2012, 7 pages.

U.S. Appl. No. 13/020,678, filed Feb. 3, 2011, Office Action mailed Jul. 30, 2012, 15 pages.

U.S. Appl. No. 13/035,525, filed Feb. 25, 2011, Office Action mailed Jul. 18, 2012, 15 pages.

\* cited by examiner

USER CONTROL OF THE DISPLAY OF MATRIX CODES

FIELD OF THE INVENTION

This disclosure relates generally to matrix codes, and more specifically to altering how matrix codes are displayed based on user input.

SUMMARY

The present disclosure discloses systems and methods for user control of matrix codes (such as QR codes). An electronic device may determine to transmit a display image that includes a matrix code to a display device. The electronic device may receive user input specifying to alter an aspect of the display of the matrix code. In response to receiving the user input, the electronic device may generate an updated display image in accordance with the user input. The electronic device may transmit the updated display image to the display device. Hence, because the electronic device is able to alter display of the matrix code in response to the user input, users may be able to control matrix code display in order to conveniently capture matrix codes.

The electronic device may alter a variety of different aspects of how matrix codes are displayed in response to user input. Such alteration of aspects of matrix code display in response to user input may include increasing and/or decreasing a size of the matrix code, changing a position of the matrix code, removing display of the matrix code that the electronic device would otherwise continue to display, continuing to display the matrix code beyond a duration that the electronic device would otherwise display the matrix code, continuing to display the matrix code beyond a duration that the electronic device would otherwise display the matrix code until additional user input is received, replacing the matrix code with a different version of the matrix code, replacing the matrix code with a simplified version of the matrix code by compressing the information represented by the matrix code, and so on.

In some implementations, the electronic device may generate the matrix code and may generate the updated display image by generating a modified matrix code in accordance with the specifications included in the user input. In other implementations, the electronic device may receive different versions of the matrix code and may select one of the different versions of the matrix code for inclusion in the display image. In such other implementations, the electronic device may generate the updated display image by selecting a different version of the matrix code for inclusion in the updated display image. In still other implementations, the electronic device may receive the display image that includes the matrix code, detect the matrix code in the display image, decode information from the detected matrix code, generate an additional matrix code that includes the decoded information and complies with the user input, and generate the updated display image by adding the additional matrix code to the display image.

Additionally, the electronic device may provide matrix codes based on other matrix codes independent of user input. The electronic device may receive a display image that includes a matrix code, detect the matrix code in the display image, decode information from the detected matrix code, generate an additional matrix code that includes the decoded information, and generate an updated display image by adding the additional matrix code to the display image.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Electronic devices (such as set top boxes, television receivers, digital video recorders, digital video disc players, televisions, desktop computers, electronic kitchen appliances, and so on) may display matrix codes, such as QR codes, for a variety of purposes. These purposes may include, but are not limited to, connecting users to information, providing content that is related to an aspect of the electronic device, facilitating ordering of products or services, assisting users in operating the electronic device, and so on. To make use of matrix codes displayed by an electronic device, a user may capture the matrix code utilizing a matrix code reader device. For example, a user may take a picture of the matrix code using a camera on a cellular telephone. The cellular telephone may include an application that decodes information from the captured matrix code and performs one or more actions based on that information (such as displaying the decoded information, connecting to a web site transmitting the decoded information to another device, and so on), an application that transmits the captured matrix code to another device for decoding and performing actions, and so on.

However, the matrix code reader may have limitations regarding its ability to capture matrix codes displayed by electronic devices. For example, a camera on a cellular telephone may not have enough resolution to capture a matrix code displayed at a certain size by an electronic device. By way of another example, the duration of time that an electronic device displays a matrix code may not be sufficiently long enough to allow a user to utilize the matrix code reader to capture the matrix code. Hence, because the electronic devices control, how and when matrix codes are displayed, users may not be able to utilize matrix code readers to conveniently capture displayed matrix codes and thus may not be able to take advantage of the purposes for which such matrix codes are displayed.

The present disclosure discloses systems and methods for user control of matrix codes. An electronic device may determine to transmit a display image that includes a matrix code to a display device. The electronic device may receive input from a user that specifies to alter one or more aspects of how the matrix code is displayed. Such aspects may include a size and/or position of how the matrix code is displayed, how long the matrix code is displayed, a complexity of information encoded in the displayed matrix code, and so on. In response to the user input, the electronic device may generate an updated display image in accordance with the user input and may transmit the updated display image to the display device. As the electronic device is able to alter the display of the matrix code in response to the user input, the electronic device enables the user to control the display of the matrix code in order to conveniently capture the matrix code.

Figure 1:
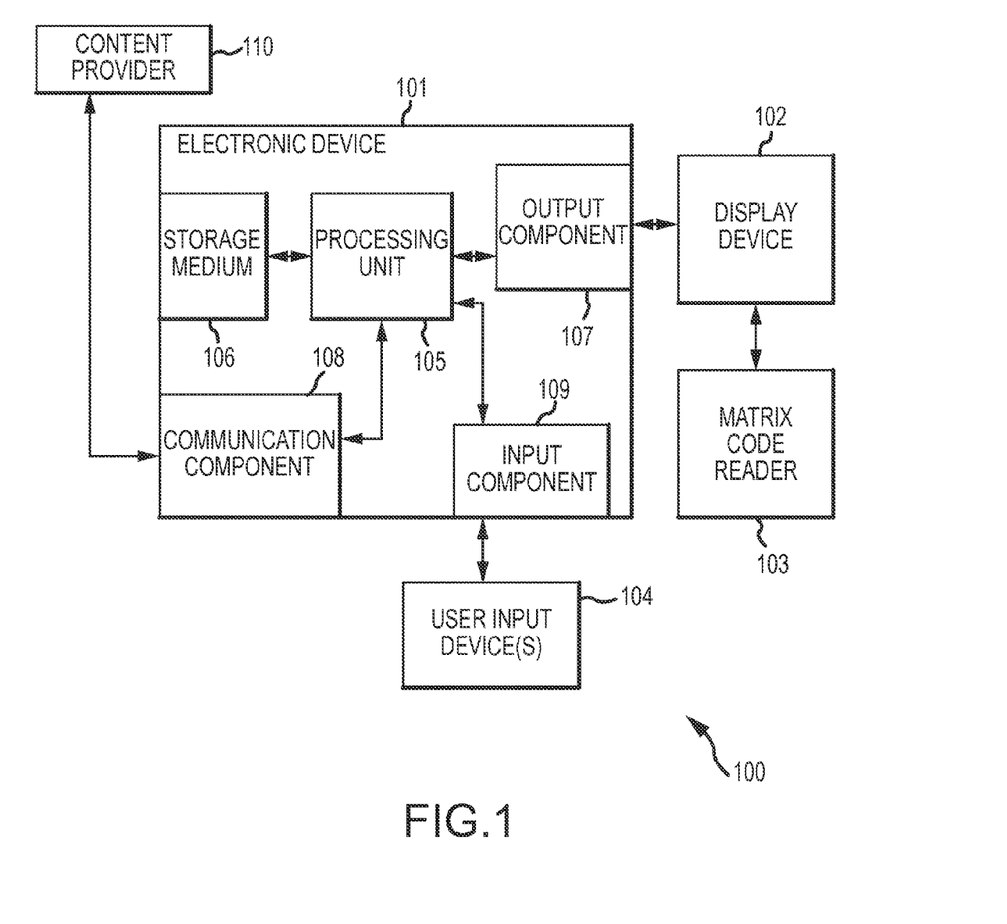
FIG. 1 is a block diagram illustrating a system for user control of matrix codes.

FIG. 1 is a block diagram illustrating a system 100 for user control of matrix codes. The system 100 may include an electronic device 101, one or more display devices 102, one or more user input devices 104, and one or more matrix code readers 103. The electronic device may be any kind of electronic device, such as a set top box, a television receiver, a digital video recorder, digital video disc player, a television, a desktop computer, a electronic kitchen appliance, and so on. The display device may be any display device such as a cathode ray tube screen, a liquid crystal display, a computer monitor, a television, and so on. The user input device may be any kind of user input device such as a remote control, a mouse, a keyboard, a track pad, a track ball, a virtual keyboard, a touch screen, a microphone, and so on. The matrix code reader may be any kind of matrix code reader such as a bar code scanner; a cellular telephone, smart phone, and/or mobile computing device with a camera; and so on It should be understood that although the user input device and the matrix code reader are illustrated and described as separate devices, in various implementations the user input device and the matrix code reader may be incorporated into a single device.

The electronic device 101 may include one or more processing units 105, one or more non-transitory storage media 106 (which may take the form of, but is not limited to, a magnetic storage medium; optical storage medium; magneto-optical storage medium; read only memory; random access memory; erasable programmable memory; flash memory; and so on), one or more output components 107, and one or more input components 109. The processing unit may execute instructions stored in the non-transitory storage medium to determine to transmit a display image (which may include one or more video frames) that includes a matrix code (such as a QR code) to the display device 102 via the output component. Determining to transmit a display image that includes a matrix code may include transmitting the display image that the processing unit determined to transmit to the display device. Further, determining to transmit a display image that includes a matrix code may include the processing unit determining to transmit a display image that happens to include a matrix code although the processing unit may not be aware that the display image includes the matrix code. After the processing unit transmits the display image, the display device may then display the display image that includes the matrix code and the matrix code reader 103 may be utilized to attempt to capture the displayed matrix code.

The user input device 104 may receive input from a user that specifies to alter one or more aspects of how the matrix code is displayed. Such aspects may include a size and/or position of how the matrix code is displayed, how long the matrix code is displayed, a complexity of information encoded in the displayed matrix code, and so on. The processing unit 105 may receive the user input from the user input device via the input component 109. The processing unit may then execute instructions stored in the non-transitory storage medium to generate an updated display image in accordance with the user input and transmit the updated display image to the display device 102 via the output component 107.

In some implementations, the user input device 104 may receive the input from the user subsequent to the processing unit 105 transmitting the display image to the display device 102 via the output component 107. As such, the input from the user may be received in response to the display device displaying the display image. However, in other implementations the user input may be user preferences which are received prior to the processing unit determining to transmit the display image to the display device. Such user preferences may be stored in the non-transitory storage media 106. As such the processing unit may not transmit the display image to the display device at all but may generate the updated display image based on the user preferences and transmit the updated display image to the display device without ever having transmitted the display image.

In some implementations, the electronic device 101 may generate the matrix code. In such implementations, the electronic device may generate the updated display image by generating a modified matrix code in accordance with the specifications included in the user input. In other implementations, the electronic device may receive different versions of the matrix code from a content provider 110 (which may be any kind of content provider such as a cable or satellite television provider, an Internet service provider, and so on) via a communication component 108 (which may be any kind of communication component such as a satellite communication component, a wired or wireless network communication component, a coaxial communication component, and so on) and may select one of the different versions of the matrix code for inclusion in the display image. In such implementations, the electronic device may generate the updated display image by selecting a different version of the matrix code for inclusion in the updated display image.

In still other implementations, the electronic device may receive the display image that includes the matrix code from the content provider, detect the matrix code in the display image, decode information from the detected matrix code, generate an additional matrix code that includes the decoded information and complies with the user input, and generate the updated display image by adding the additional matrix code to the display image. As the electronic device may be aware of the position and/or size of the matrix code in the display image from detecting the matrix code, the electronic device may overlay the additional matrix code and/or other graphics over a portion of the matrix code. Thus, the electronic device may obscure at least a part of the matrix code with the additional matrix code. Although the electronic device is described as generating an additional matrix code based on a matrix code included in a display image in response to user input, it should be understood that in various implementations the electronic device may generate the additional matrix code based on the matrix code included in a received display image absent user input.

Figure 2:
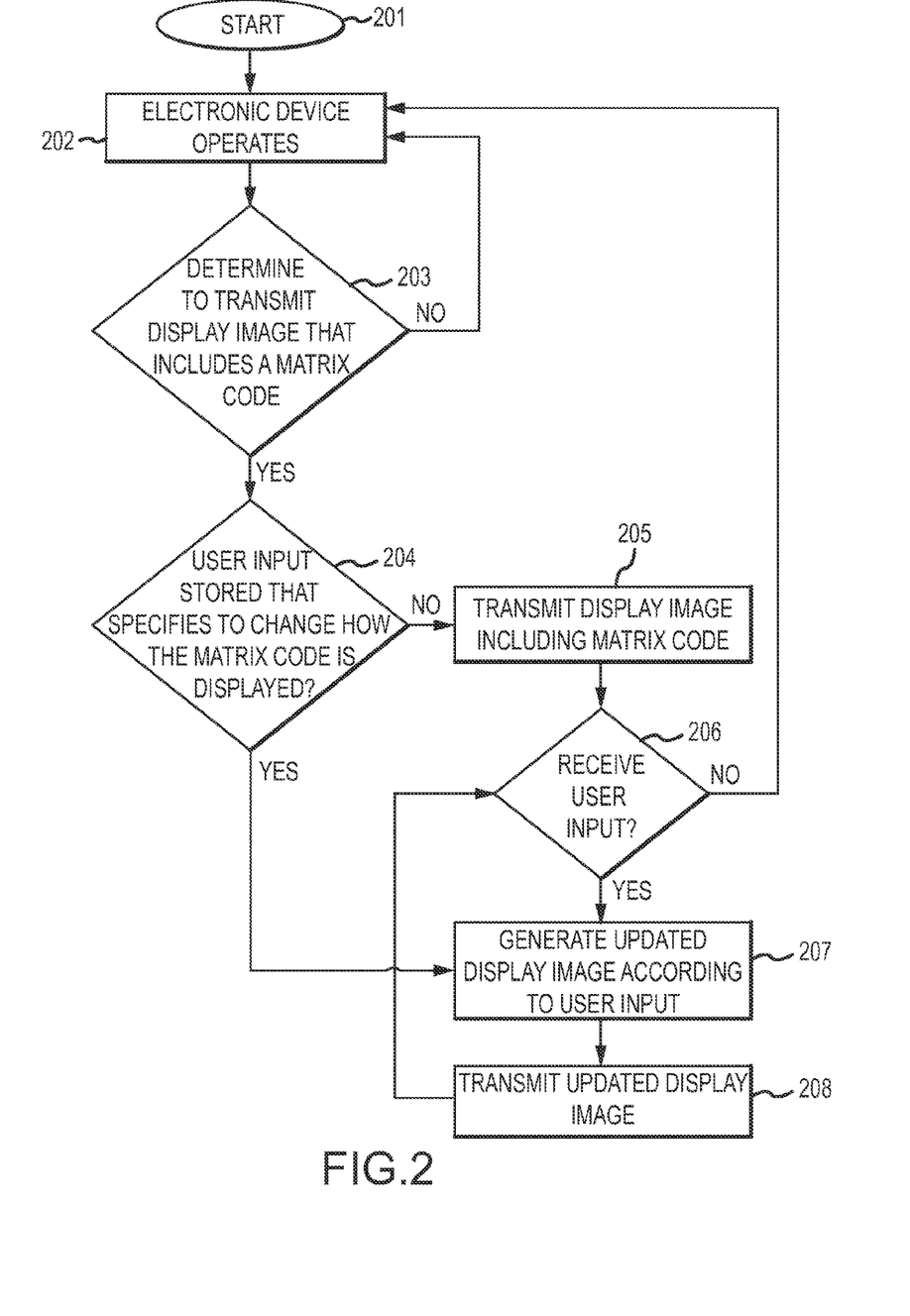
FIG. 2 is a flow chart illustrating a method for user control of matrix codes. This method may be performed by the system of FIG. 1.

FIG. 2 illustrates a method 200 for user control of matrix codes. The method 200 may be performed by the electronic device 101 of FIG. 1. The flow begins at block 201 and proceeds to block 202 where the electronic device 101 operates. The operation of the electronic device may include transmission of multiple display images to the display device 102. The flow then proceeds to block 203 where the electronic device determines whether or not to transmit a display image that includes a matrix code to the display device. Determination to transmit a display image that includes a matrix code to the display device may include the electronic device transmitting the display image without being aware of the matrix code. Alternatively, the electronic device may detect the matrix code in the display image, generate the matrix code and include the matrix code in the display image, and so on and may thus be aware that the matrix code is included in the display image. If not, the flow returns to block 202 and the electronic device continues to operate. Otherwise, the flow proceeds to block 204.

At block 204, the electronic device determines whether user input is stored that specifies to change how the matrix code is displayed. If so, the flow proceeds to block 207. Otherwise, the flow proceeds to block 205 where the electronic device transmits the display image that includes the matrix code. The flow then proceeds to block 206.

At block 206, after the electronic device 101 transmits the display image that includes the matrix code to the display device 102, the electronic device determines whether or not user input specifying to change how the matrix code is displayed has been received. If not, the flow proceeds to block 202 and the electronic device continues to operate. Otherwise, the flow proceeds to block 207.

At block 207, the electronic device 101 generates an updated display image according to the specifications included in the user input. The flow then proceeds to block 208 where the electronic device transmits the updated display image to the display device 102. Next, the flow returns to block 206 where the electronic device determines whether or not user input specifying to change how the matrix code is displayed has been received.

Returning to FIG. 1, the user input may specify a variety of different alterations to make to aspects of how the matrix code is displayed. In a first example, the user input may specify to increase the size of the matrix code and, in response to such user input, the processing unit 105 may generate the updated display image such that the matrix code included in the updated display image is larger, as specified by the user input, than the matrix code included in the display image. Because the matrix code included in the updated display image is larger, capture of the larger matrix code by the matrix code reader 103 may be simplified.

In a second example, the user input may specify to decrease the size of the matrix code and, in response to such user input, the processing unit 105 may generate the updated display image such that the matrix code included in the updated display image is smaller than the matrix code included in the display image as specified by the user input. In a third example, the user input may specify to move of the matrix code to a different position and in response to such user input, the processing unit 105 may generate the updated display image such that the matrix code included in the updated display image is in a different position than the matrix code included in the display image as specified by the user input.

Further, the user input may specify to alter how long a period of time the electronic device 101 displays the matrix code on the display device 102. For example, the electronic device may display the matrix code on the display device 102 until user input is received (such as a cancel button on a remote control) that specifies not to display the matrix code anymore. In a first instance of this example, the electronic device may be overlaying the matrix code over frames of content that the electronic device is transmitting to the display device and may thus continue overlaying the matrix code, over successive frames until the user input is received. In a second instance of this example, the electronic device may detect the matrix code in frames of content that the electronic device is transmitting to the display device and may pause the content (continuously transmitting the frame of content at the moment of pausing of the content) until the user input is received. In a third instance of this example, the electronic device may transmit display images including successively larger versions of the matrix code until the user input is received.

In a fourth instance of this example, the electronic device may transmit the matrix code to the display device for a period of time and the user input may specify to display the matrix code for a longer duration of time, such as specifying to continue displaying the matrix code until the user transmits additional input specifying to stop displaying the matrix code. The user input in this example may include user preferences, such as preferences that specify to display matrix codes related to weather updates for a longer duration of time than they would otherwise be displayed, but not to display matrix codes related to auto commercials for a longer duration than they would otherwise be displayed.

Additionally, the user input may specify to simplify the displayed matrix code. In response to such input, the electronic device 101 may decode the matrix code, compress the information decoded from the matrix code, generate a new matrix code utilizing the compressed information, and generated the updated display screen including the new matrix code. As the information decoded from the displayed matrix code is compressed, the new matrix code will be simpler than the displayed matrix code and capture of the new matrix code by the matrix code reader 103 may be simplified.

Figure 3A:
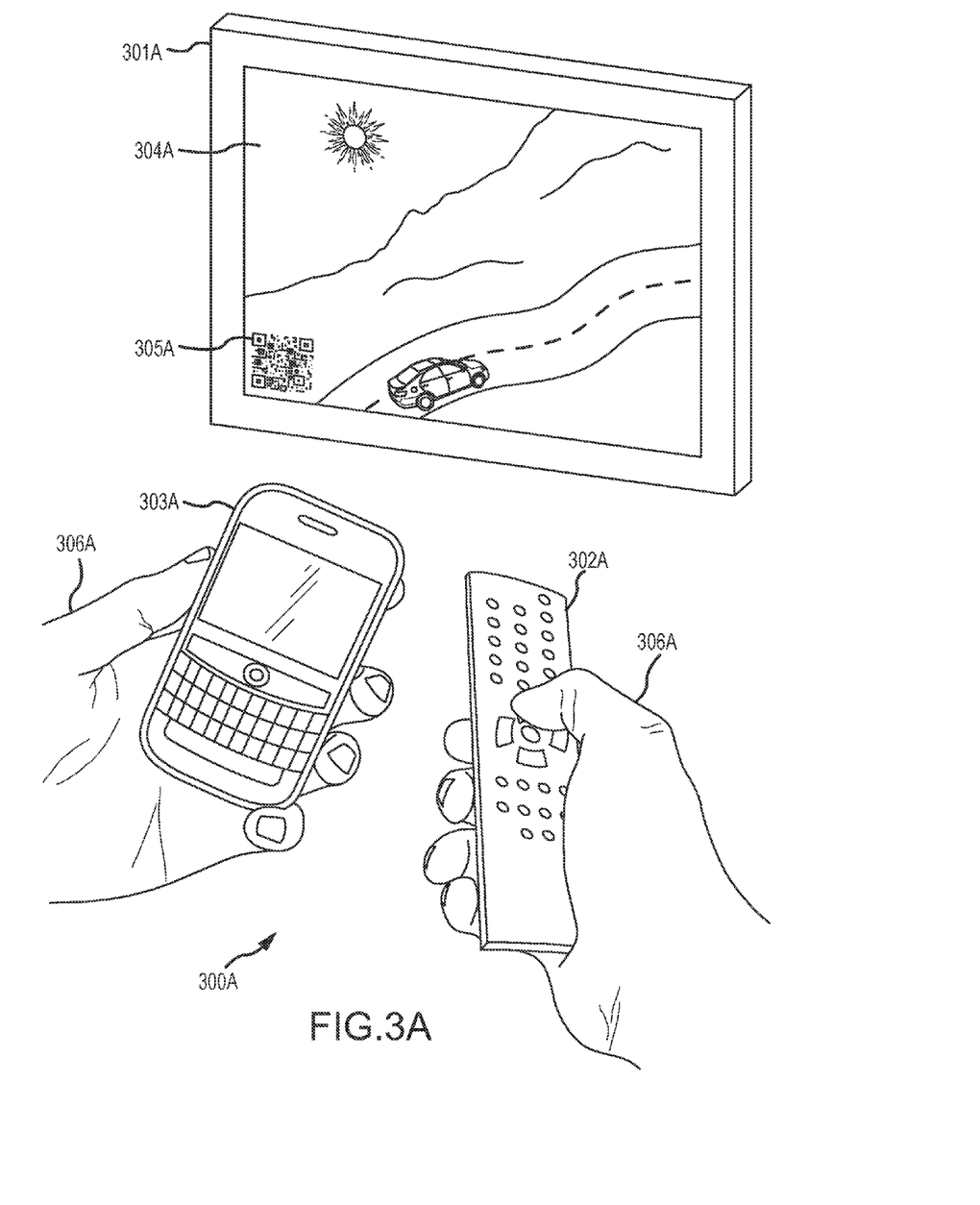
FIGS. 3A-3H are diagrams illustrating a user controlling matrix codes displayed on a television. The system may be the system of FIG. 1.

FIGS. 3A-3H illustrate a user 306A-306H controlling matrix codes 305A-305H displayed on a television 301A-301H. As shown in FIG. 3A, the user 306A is watching a television 301A that is displaying a movie on a screen 304A. As illustrated, the television displays a matrix code 305A along with the movie on the screen. Also as illustrated, the user may be able to capture the displayed matrix code utilizing a cellular telephone 303A and/or control the display of the matrix code utilizing a remote control 302A.

Figure 3B:
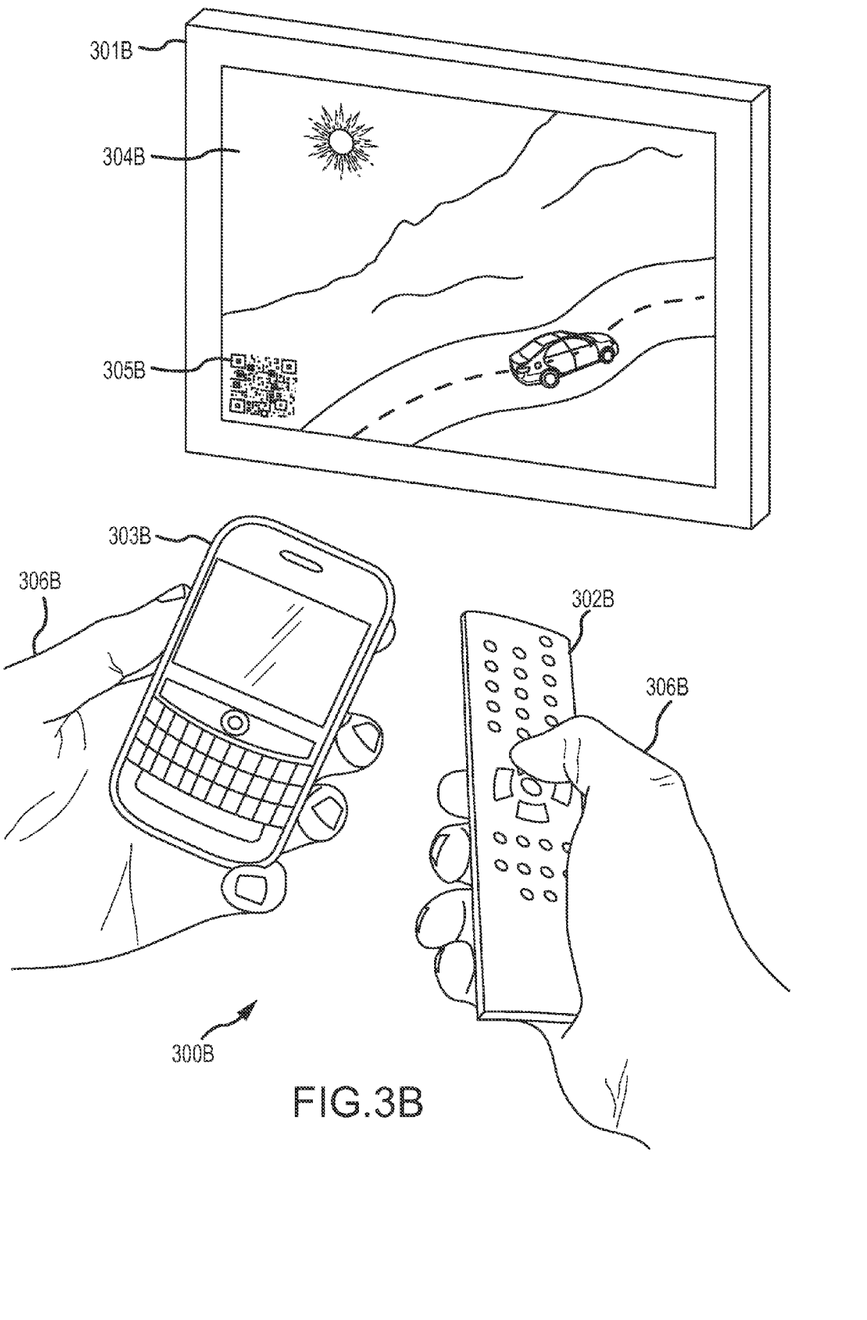
Figure 3C:
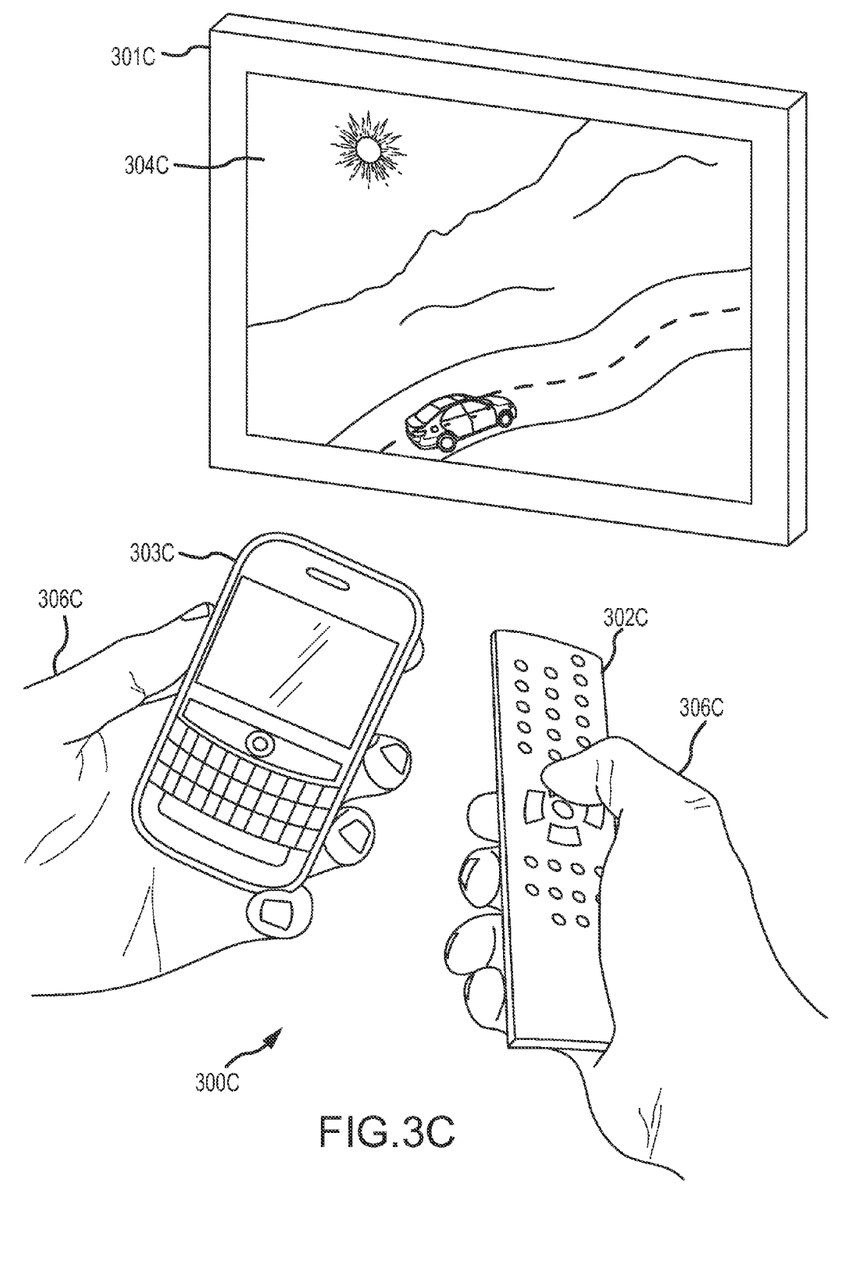

In a first example, the television 301A is configured to display the matrix code 305A on the screen 304A until the user 306A enters input on the remote control device 302A specifying to cease displaying the matrix code. As shown by FIG. 3B where the user has not entered input specifying to cease displaying the matrix code, the television continues displaying the movie as well as the matrix code. After the user enters input specifying to cease displaying the matrix code, the television may display the movie without the matrix code as shown in FIG. 3C.

Figure 3D:
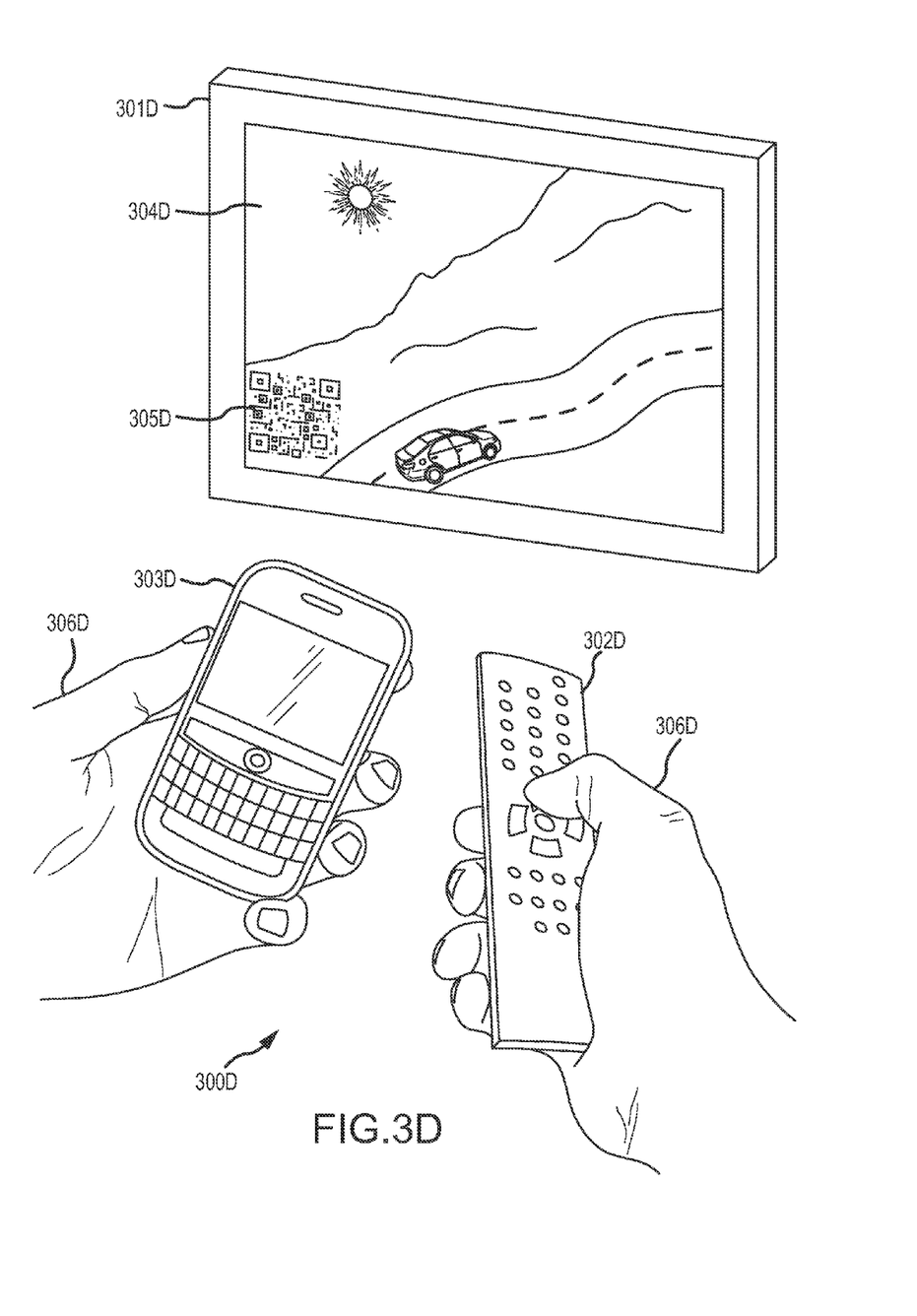

In a second example, the television 301A displays the matrix code 305A on the screen 304A and the user enters input using the remote control device 302A specifying to increase the size at which the matrix code is displayed. In response, as illustrated by FIG. 3D, the television 301D displays the movie on the screen 304D with the matrix code 305D that is larger than the matrix code 305A of FIG. 3A.

Figure 3E:
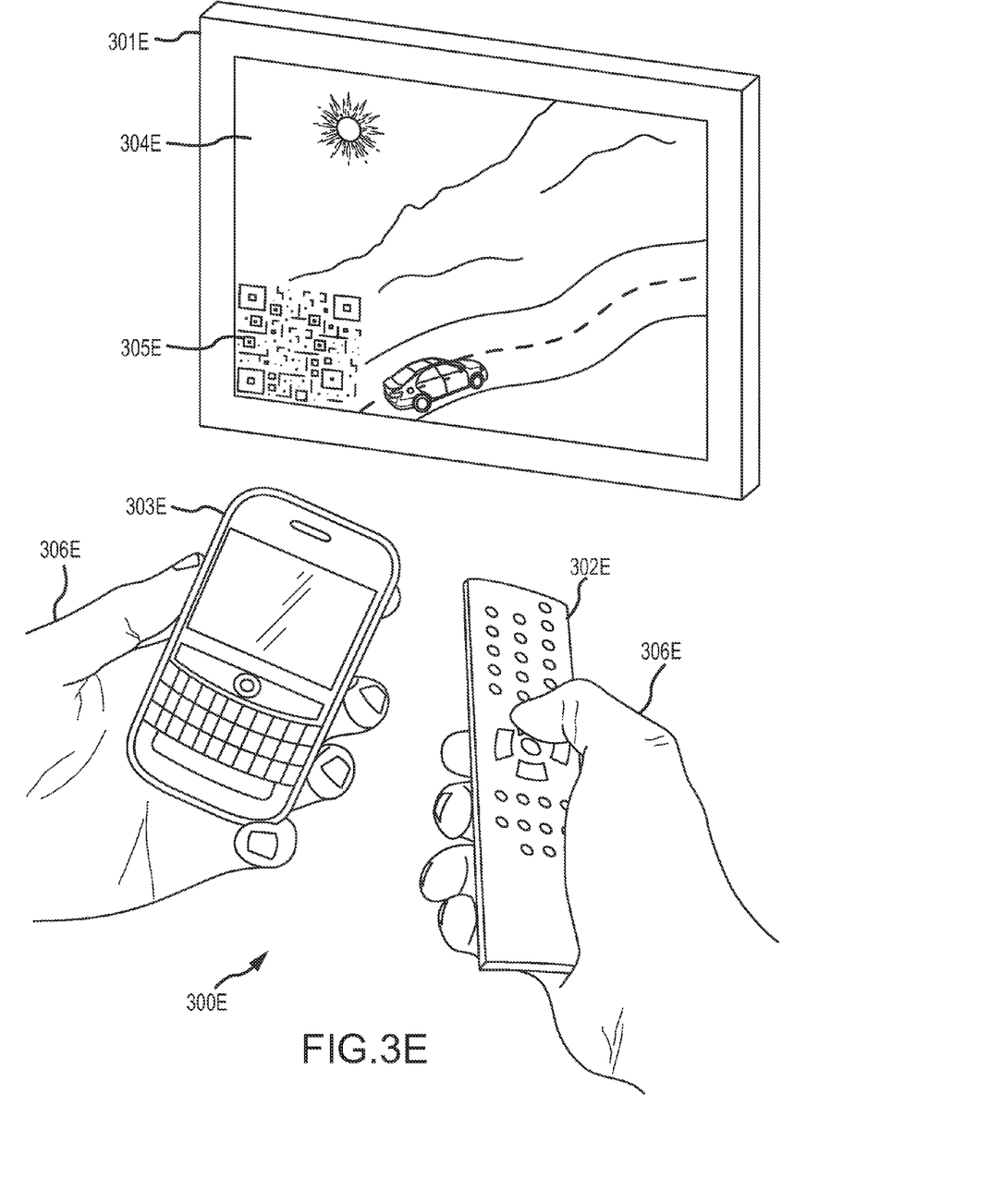
Figure 3F:
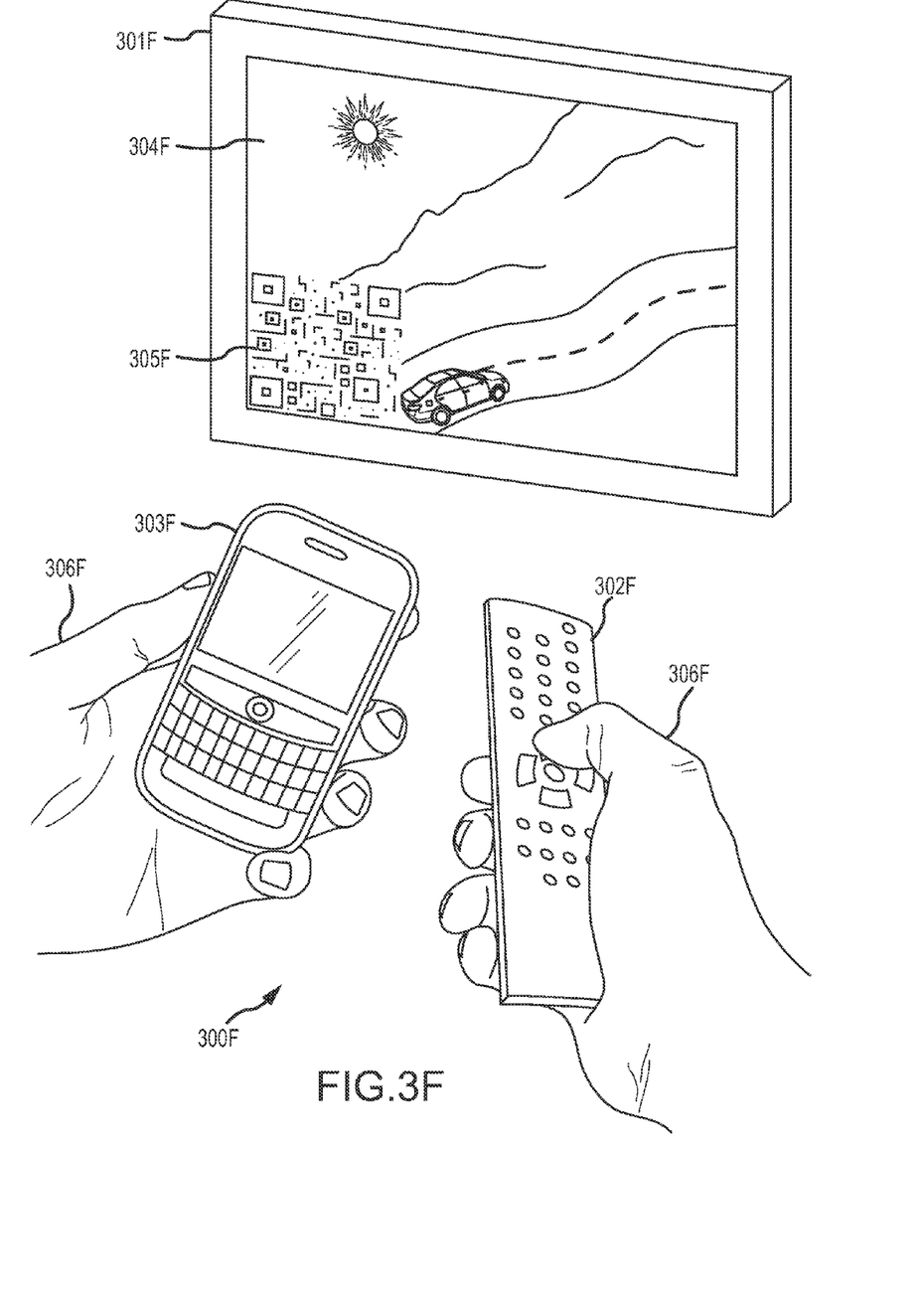
Figure 3G:
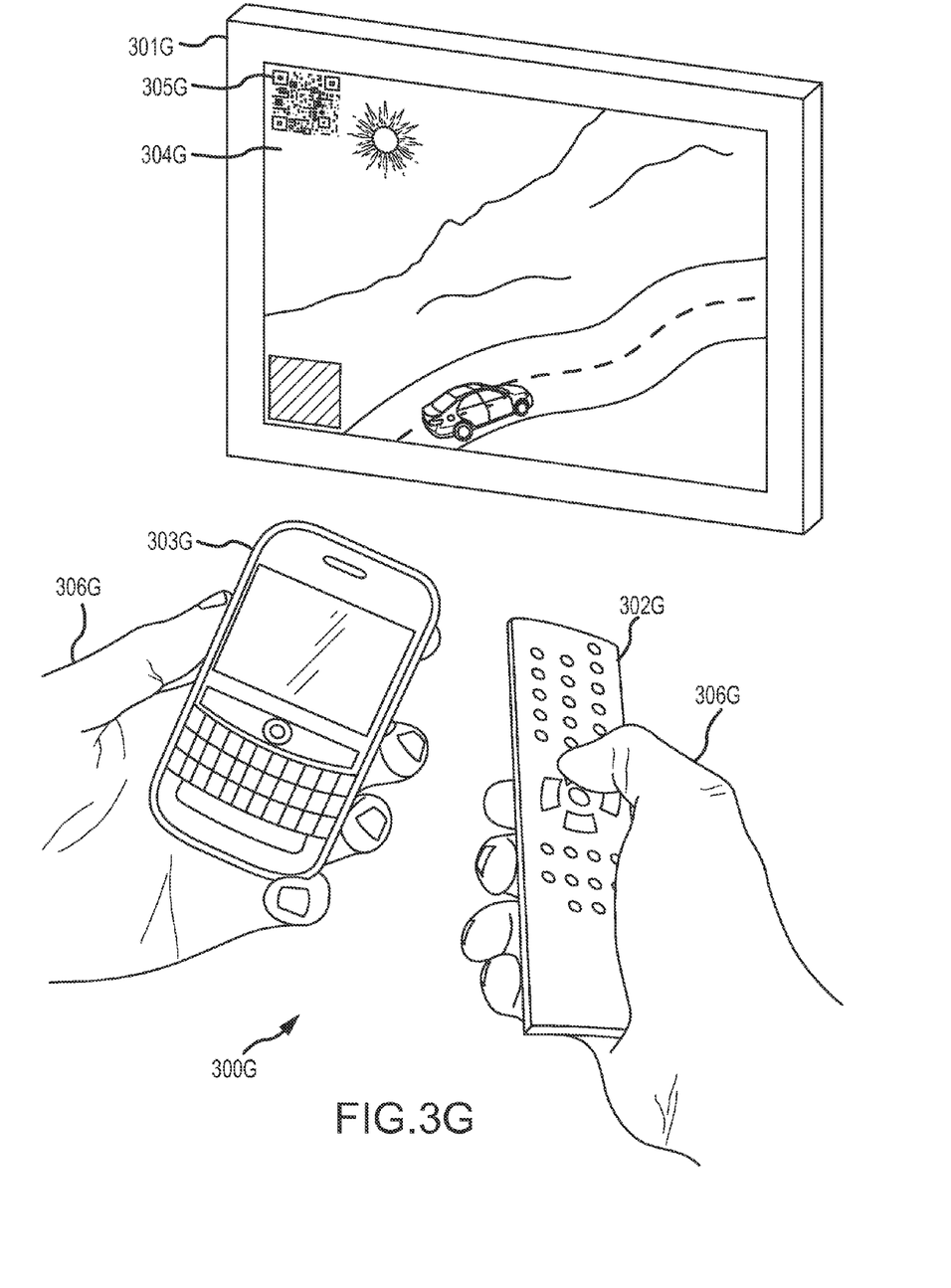

In a third example, the television 301A displays the matrix code 305A on the screen 304A and the user enters input using the remote control device 302A specifying to change the position of the displayed matrix code from the approximate bottom of the screen to the approximate top of the screen. In response, as illustrated by FIG. 3G, the television 301 G displays the movie on the screen 304G with the matrix code 305G located at the approximate top of the screen. Further, in this example the television 301G received the matrix code 305G as part of the video signal that the television displays on the screen 304G. Thus, the television does not have the video information for the portion of the screen where the matrix code 305A was displayed in FIG. 3A. As such, the television displays a blank or black box covering that portion of the screen. However, in implementations where the television generated the matrix code 305G, the television may have the video information for the portion of the screen where the matrix code 305A was displayed in FIG. 3A and may display such video information at that portion of the screen instead of the illustrated blank or black box when changing the position of the matrix code 305G.

In a fourth example, the television 301A is configured to display increasingly larger versions of the matrix code 305A on the screen 304A until the user 306A enters input on the remote control device 302A specifying to cease displaying the matrix code. As shown by FIGS. 3D where the user has not entered input specifying to cease displaying the matrix code, the television continues displaying the movie as well as a larger version of the matrix code 305D than the matrix code 305A of FIG. 3A. In FIG. 3E, the user still has not entered input specifying to cease displaying the matrix code and the television continues displaying the movie as well as a larger version of the matrix code 305E than the matrix code 305D of FIG. 3D. In FIG. 3F, the user has again not entered input specifying to cease displaying the matrix code and the television continues displaying the movie as well as a larger version of the matrix code 305F than the matrix code 305E of FIG. 3E. After the user enters input specifying to cease displaying the matrix code, the television may display the movie without the matrix code as shown in FIG. 3C.

In a fifth example, the television 301A is configured to detect matrix codes in frames of content that is to be displayed on the screen 304A and freeze that frame of content until the user 306A enters input on the remote control device 302A specifying to cease displaying the matrix code. Thus, the screen 304A remains as shown in FIG. 3A until the input is received as the movie does not continue but instead the frame including the matrix code is paused. After the user enters input specifying to cease displaying the matrix code, the television may display the movie without the matrix code as shown in FIG. 3C.

In a sixth example, the television 301A is configured to display the matrix code 305A on the screen 304A for a period of time, but the user 306A enters input on the remote control device 302A specifying to continue displaying the matrix code until the user enters an additional input. As shown by FIG. 3B where the user has not entered the additional input, the television continues displaying the movie as well as the matrix code. After the user enters additional input, the television may display the movie without the matrix code as shown in FIG. 3C.

In a seventh example, the television 301A receives a movie to display on the screen 304A that includes a matrix code 305A. Subsequently, the television receives input entered by the user 306A via the remote control 302A to increase the size of the matrix code 305A. In response, the television decodes the matrix code 305A and generates a new matrix code that is larger than matrix code 305A and includes the decoded information. As illustrated in FIG. 3D, the television 3D then overlays the matrix code 305D over the matrix code included in the movie (not visible as it is obscured by the overlaid matrix code 305D generated by the television).

Figure 3H:
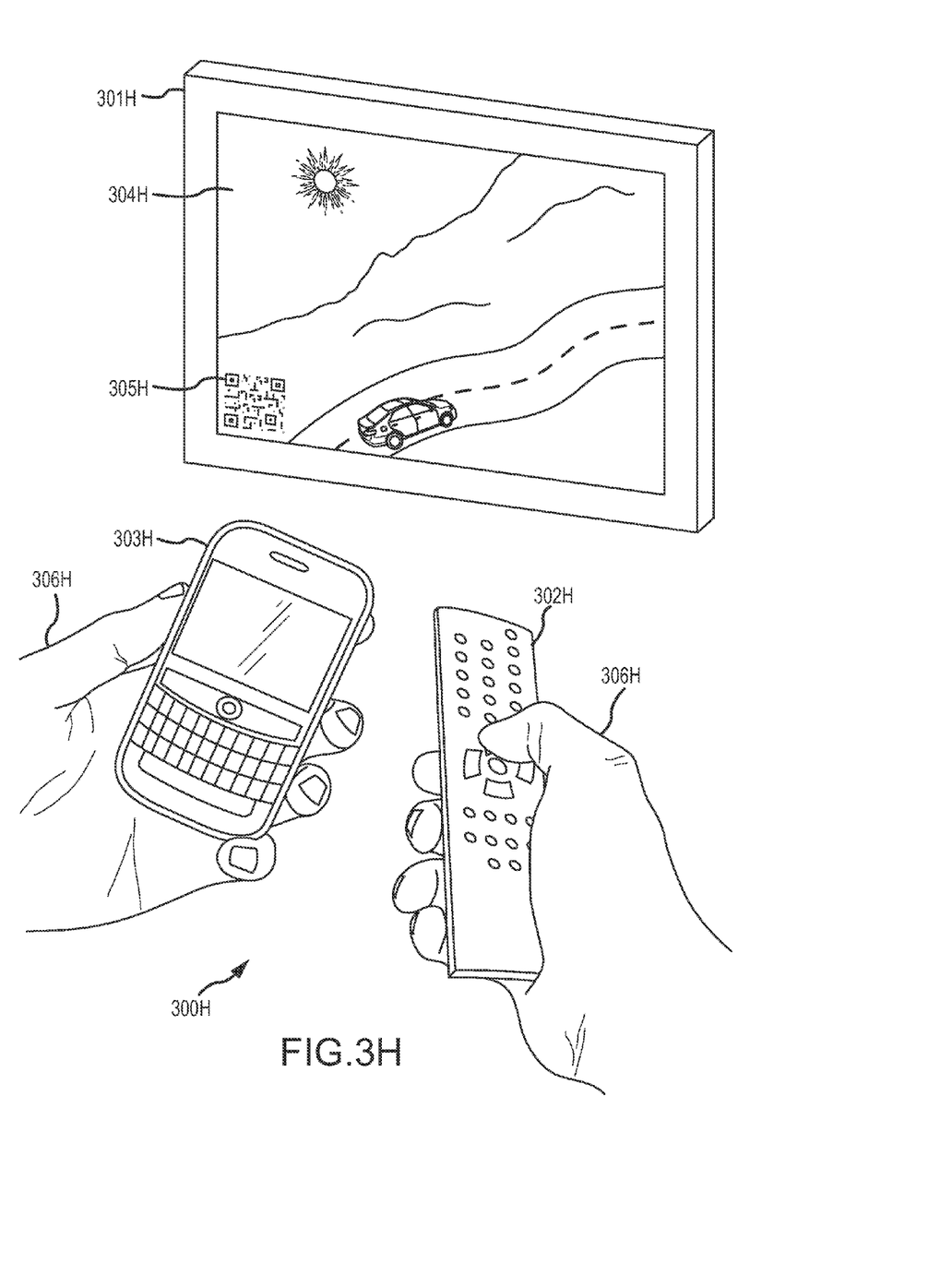

In an eighth example, the television 301A receives a movie to display on the screen 304A that includes a matrix code 305A. Subsequently, the television receives input entered by the user 306A via the remote control 302A to decrease the complexity of the matrix code 305A. In response, the television decodes the matrix code 305A, compresses the information decoded from the matrix code 305A, and generates a new matrix code including the compressed information which is simpler (as specified by the user input) because it represents compressed as opposed to uncompressed information. As illustrated in FIG. 3H, the television 3H then overlays the matrix code 305H over the matrix code included in the movie (not visible as it is obscured by the overlaid matrix code 305H generated by the television).

It should be understood that the examples discussed above are for the purposes of illustration. Different user control of matrix codes may be performed than those illustrated without departing from the scope of the present disclosure.

Figure 4:
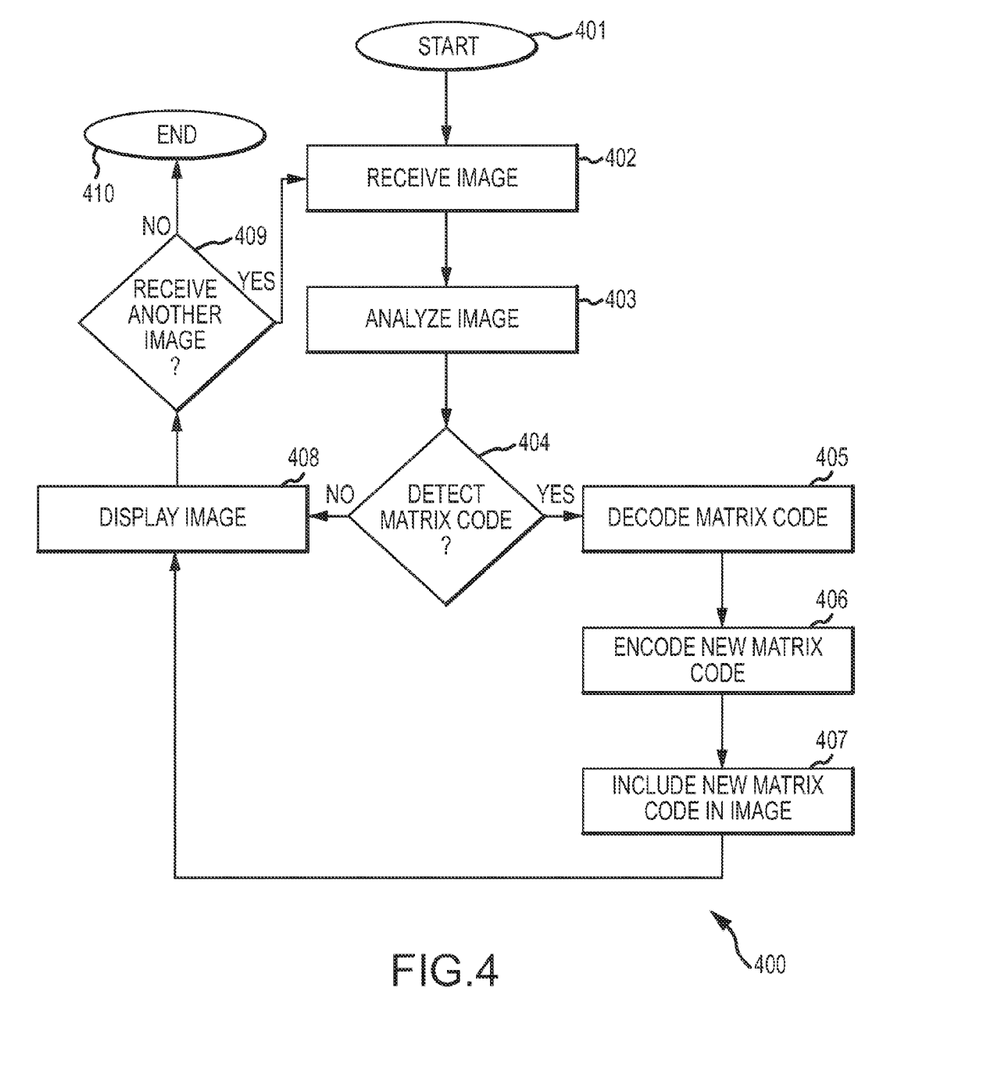
FIG. 4 is a flow chart illustrating a method for providing matrix codes based on other matrix codes. This method may be performed by the system of FIG. 1.

FIG. 4 illustrates a method 400 for providing matrix codes based on other matrix codes. The method 400 may be performed by the electronic device 101 of FIG. 1. The flow begins at block 401 and proceeds to block 402 where the electronic device receives a display image. The flow then proceeds to block 403 where the electronic device analyzes the received display image before the flow proceeds to block 404.

At block 404, the electronic device determines whether or not a matrix code is detected in the display image. If so, the flow proceeds to block 405. Otherwise, the flow proceeds to block 408 where the electronic device transmits the display image to the display device 102, which then displays the display image.

At block 405, after the electronic device 101 determines that a matrix code is detected in the display image, the electronic device decodes the matrix code. The flow then proceeds to block 406 where the electronic device encodes a new matrix that includes information decoded from the matrix code. Next, the flow proceeds to block 407 where the electronic device includes the new matrix code in the display image. The flow then proceeds to block 408 where the electronic device transmits the display image to the display device 102, which then displays the display image.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for user control of matrix codes, the method comprising:
    receiving at an electronic device at least one display image including either at least one matrix code, or at least one display image and additional information to be encoded in at least one matrix code;
    encoding the additional information if received in at least one matrix code to be included with the at least one display image;
    determining to transmit the at least one display image that includes at least one matrix code from the electronic device to a display device;
    receiving, utilizing the electronic device, at least one user input that specifies to alter at least one aspect of how the at least one matrix code is displayed;
    generating an updated at least one display image from the received at least one display image in accordance with the at least one user input utilizing the electronic device; and
    transmitting the updated at least one display image from the electronic device to the at least one display device.

2. The method of claim 1, wherein said operation of determining to transmit at least one display image that includes at least one matrix code from an electronic device to a display device further comprises transmitting the at least one display image that includes that at least one matrix code until the at least one user input is received.

3. The method of claim 1, wherein the at least one matrix code has at least one of a size or a position, the at least one user input specifies to alter the at least one of the size or the position, and said operation of generating an updated at least one display image in accordance with the at least one user input comprises generating the updated at least one display image including a version of the at least one matrix code with the altered at least one of the size or the position.

4. The method of claim 1, wherein said operation of determining to transmit at least one display image that includes at least one matrix code from an electronic device to a display device further comprises transmitting a series of display images wherein each display image of the series except the first display image includes a larger version of the at least one matrix code than the previous display image of the series.

5. The method of claim 4, wherein said operation of transmitting a series of display images further comprises transmitting the series of display images until the at least one user input is received.

6. The method of claim 1, wherein said operation of determining to transmit at least one display image that includes at least one matrix code from an electronic device to a display device further comprises:
    transmitting a series of image frames from the electronic device to the display device;
    detecting, utilizing the electronic device, that the at least one matrix code is present in an image frame of the series of image frames; and
    transmitting the image frame of the series of image frames from the electronic device to the display device until the at least one user input is received.

7. The method of claim 1, wherein the at least one matrix code is at least one of generated by the electronic device and included by the at least one electronic device in the at least one display image or selected by the electronic device from a plurality of versions of the at least one matrix code and included by the at least one electronic device in the at least one display image.

8. The method of claim 1, wherein the electronic device receives the at least one display image that includes the at least one matrix code and said operation of generating an updated at least one display image in accordance with the at least one user input further comprises:
    analyzing the at least one display image, utilizing the electronic device; to detect the at least one matrix code;
    decoding the at least one matrix code utilizing the electronic device;
    coding an additional at least one matrix code that includes information decoded from the at least one matrix code, utilizing the electronic device, in accordance with the at least one user input; and
    including the additional at least one matrix code in the updated at least one display image utilizing the electronic device.

9. The method of claim 1, wherein generating an updated at least one display image further comprises:
    compressing information, utilizing the electronic device, wherein the information is included in the at least one matrix code;
    coding an additional at least one matrix code that includes the compressed information utilizing the electronic device; and
    including the additional at least one matrix code in the updated as least one display image utilizing the electronic device.

10. A method for user control of matrix codes, the method comprising:
    receiving at an electronic device at least one display image including either at least one matrix code, or at least one display image and additional information to be encoded in at least one matrix code;
    encoding the additional information if received in at least one matrix code to be included with the at least one display image;
    determining to transmit the at least one display image that includes at least one matrix code from the electronic device to a display device;
    receiving, utilizing the electronic device, at least one user input that specifies to alter at least one aspect of how the at least one matrix code is displayed, wherein the at least one user input specifies to keep displaying the at least one matrix code until an additional at least one user input is received;
    generating an updated at least one display image from the received at least one display image in accordance with the at least one user input utilizing the electronic device, the updated at least one display image comprising the at least one display image; and transmitting the updated at least one display image from the electronic device to the at least one display device until the additional at least one user input is received.

11. An electronic device, comprising:
one or more input components configured to receive either at least one display image including at least one matrix code, or at least one display image and additional information to be encoded in at least one matrix code;
at least one output component that determines to transmit at least one display image to a display device wherein the at least one display image includes at least one matrix code;
at least one input component that receives at least one user input specifying to alter at least one aspect of how the at least one matrix code is displayed; and
at least one processing unit, communicably coupled to the at least one output component and the one or more input components, that is configured to encode the additional information if received in at least one matrix code to be included with the at least one display image, and generate an updated at least one display image from the received at least one display image in accordance with the at least one user input;
wherein the at least one processing unit transmits the updated at least one display image to the display device via the at least one output component.

12. The electronic device of claim 11, wherein the electronic device comprises a content receiver and the at least one input component receives the at least one user input from a user control device associated with the content receiver.

13. The electronic device of claim 11, wherein the at least one matrix code includes information and, according to the user input, the at least one processing unit generates the updated at least one display image by compressing the information, coding at least one additional matrix code including the compressed information, and including the at least one additional matrix code in the updated at least one display image.

14. The electronic device of claim 11, wherein the at least one processing unit generates the updated at least one display image by detecting the at least one matrix code in the at least one display image, decoding information encoded in the at least one matrix code, coding an additional matrix code including the decoded information according to the user input, and including the additional at least one matrix code in the updated at least one display image.

15. The electronic device of claim 11, wherein the at least one display image comprises a series of image frames, the at least one processing unit sequentially transmits the series of image frames to the display device via the at least one output component until detecting that an image frame of the series includes the at least one matrix code and then transmits the image frame of the series to the display device until the user input is received.

16. The electronic device of claim 11, wherein the at least one display image comprises a series of display images and each display image subsequent to the first display image of the series includes a larger version of the at least one matrix code than the previous display image of the series.

17. The electronic device of claim 11, wherein the at least one processing unit,
generates the updated at least one display image including a version of the at least one matrix code in accordance with the at least one user input wherein the version of the at least one matrix code has at least one of a different size than the at least one matrix code or a different position than the at least one matrix code.

18. The electronic device of claim 11, wherein the at least one output component transmits the at least one display image to the display device until the at least one user input is received.

19. An electronic device, comprising:
one or more input components configured to receive either at least one display image including at least one matrix code, or at least one display image and additional information to be encoded in at least one matrix code;
at least one output component that determines to transmit at least one display image to a display device wherein the at least one display image includes at least one matrix code;
at least one input component that receives at least one user input specifying to alter at least one aspect of how the at least one matrix code is displayed, wherein the at least one user input specifies to display the at least one matrix code until an additional user input is received; and
at least one processing unit, communicably coupled to the at least one output component and the one or more input components, that is configured to encode the additional information if received in at least one matrix code to be included with the at least one display image, and generate an updated at least one display image from the received at least one display image in accordance with the at least one user input, the updated at least one display image including the at least one matrix code;
wherein the at least one processing unit transmits the updated at least one display image to the display device via the at least one output component until the additional user input is received.

20. A method for providing matrix codes based on other matrix codes, comprising:
detecting, utilizing at least one electronic device, at least one matrix code included in at least one display image;
decoding information from the at least one matrix code utilizing the electronic device;
generating an additional at least one matrix code, utilizing the electronic device, that includes the decoded information;
modifying the at least one display image to include the additional at least one matrix code utilizing the electronic device; and
transmitting the modified at least one display image from the electronic device to a display device.

21. The method of claim 20, wherein said operation of modifying the at least one display image to include the additional at least one matrix code utilizing the electronic device further comprises positioning with the electronic device the additional at least one matrix code in the at least one display image based on a position of the at least one matrix code in the at least one display image.

22. The method of claim 20, wherein said operation of modifying the at least one display image to include the additional at least one matrix code utilizing the electronic device further comprises positioning with the electronic device the additional at least one matrix code in the at least one display image such that the additional at least one matrix code at least partially obscures the at least one matrix code in the at least one display image.

* * * * *